(12) United States Patent
Cheng

(10) Patent No.: US 6,761,845 B2
(45) Date of Patent: Jul. 13, 2004

(54) METHOD FOR PRODUCING A COLORFUL SOLE

(76) Inventor: Tian-Lai Cheng, 5 Fl., No. 66, Alley 7, Lane 98, Industry One Rd., Ind. Zone, Taichung (TW)

( * ) Notice: Subject to any disclaimer, the term of this patent is extended or adjusted under 35 U.S.C. 154(b) by 1 day.

(21) Appl. No.: 10/295,928

(22) Filed: Nov. 15, 2002

(65) Prior Publication Data

US 2004/0093763 A1 May 20, 2004

(51) Int. Cl.$^7$ ............................................... B29C 39/10
(52) U.S. Cl. ...................... 264/132; 264/138; 264/247; 264/250; 264/274; 264/275
(58) Field of Search ................................ 264/132, 138, 264/247, 250, 275, 279, 274

(56) References Cited

U.S. PATENT DOCUMENTS

| 2,347,872 | A | * | 5/1944 | Blanchard | .................. 12/142 R |
| 5,053,179 | A | * | 10/1991 | Masui et al. | ................. 264/257 |
| 5,725,823 | A | * | 3/1998 | Finn et al. | ................... 264/247 |

FOREIGN PATENT DOCUMENTS

JP         04261603 A  *  9/1992

* cited by examiner

Primary Examiner—Edmund H. Lee
(74) Attorney, Agent, or Firm—Dellett & Walters

(57) ABSTRACT

A method for preparing a colorful sole for a shoe, which laminates a membrane with patterns on the sole. The membrane is made of a polymer to merge with the sole to firmly combine with the sole. Additionally, the patterns are printed on the membrane, thus the patterns can be complicated and special to make a variety of changes in appearance to the colorful sole.

3 Claims, 1 Drawing Sheet

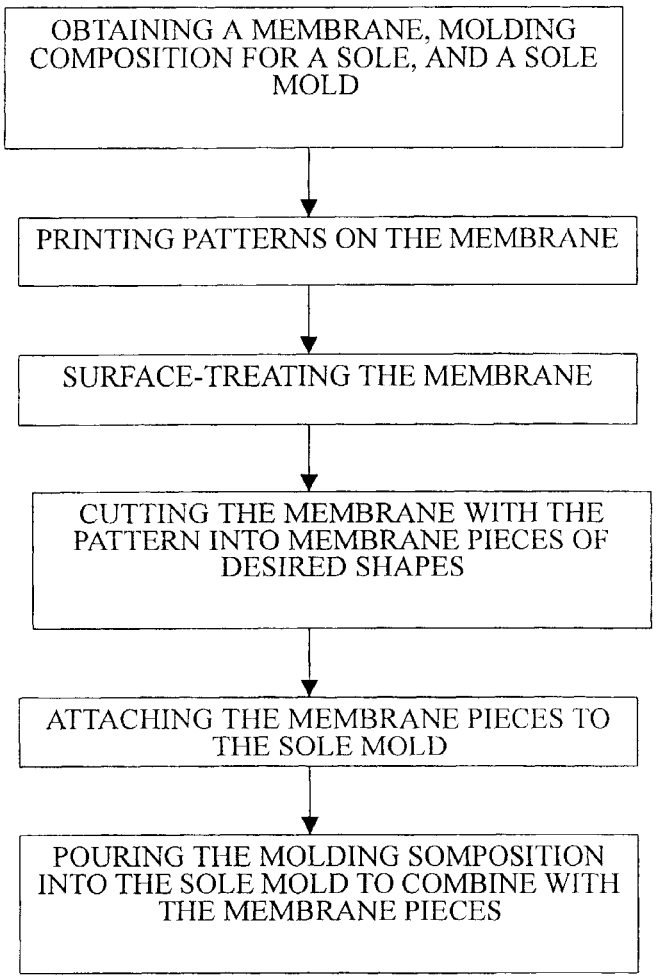

```
┌─────────────────────────────────┐
│ OBTAINING A MEMBRANE, MOLDING   │
│ COMPOSITION FOR A SOLE, AND A SOLE │
│             MOLD                │
└─────────────────────────────────┘
                │
                ▼
┌─────────────────────────────────┐
│ PRINTING PATTERNS ON THE MEMBRANE │
└─────────────────────────────────┘
                │
                ▼
┌─────────────────────────────────┐
│   SURFACE-TREATING THE MEMBRANE │
└─────────────────────────────────┘
                │
                ▼
┌─────────────────────────────────┐
│  CUTTING THE MEMBRANE WITH THE  │
│ PATTERN INTO MEMBRANE PIECES OF │
│         DESIRED SHAPES          │
└─────────────────────────────────┘
                │
                ▼
┌─────────────────────────────────┐
│  ATTACHING THE MEMBRANE PIECES TO │
│          THE SOLE MOLD          │
└─────────────────────────────────┘
                │
                ▼
┌─────────────────────────────────┐
│ POURING THE MOLDING SOMPOSITION │
│ INTO THE SOLE MOLD TO COMBINE WITH │
│       THE MEMBRANE PIECES       │
└─────────────────────────────────┘
```

FIG. 1

METHOD FOR PRODUCING A COLORFUL SOLE

BACKGROUND OF THE INVENTION

1. Field of the Invention

The present invention relates to a method for producing a colorful sole, and more particularly to a method to form a colorful sole can have complicated patterns or patterns having gradually changing colors to allow the sole to have versatile appearances.

2. Description of Related Art

Conventional methods for producing a sole include techniques such as injection molding, compression molding, casting and die-casting. All the conventional methods require pouring molding composition into molds to form the molding composition into the shape of a sole. When producing a colorful sole, manufacturers have to pour molding compositions in different colors into the mold several times and wait until the previous colored molding composition has solidified. With such a process, the colorful sole has a simple pattern with clear demarcation between the different colors. However, the appearance of the colorful sole is monotonous because the molding compositions are not easily controlled in the mold to show a regular and complicated pattern at precise positions on the sole. Even though the boundary of the pattern on the conventional colorful sole is distinct, gradually changed color patterns cannot be achieved on the colorful sole by the conventional methods. Therefore, pattern designs on the colorful sole are limited and cannot enhance the attraction of the colorful sole.

To overcome the drawbacks of the conventional methods for producing colorful soles, adhesive paper with colorful patterns is bonded to the sole, or a colorful pattern is painted with paint on the outer periphery of the sole. However, the adhesive paper easily detaches when the adhesive deteriorates, and the paint easily fades after washing. Therefore, the colorful sole with adhesive paper or patterns painted with paint do not ensure that the patterns stay on the sole for a long time.

To overcome the shortcomings, the present invention provides a method for making a colorful sole to mitigate and obviate the aforementioned problems.

SUMMARY OF THE INVENTION

The main objective of the invention is to provide a method for producing a colorful sole that has vivid and complicated patterns on outer periphery of the sole.

Further objectives, advantages and novel features of the invention will become more apparent from the following detailed description when taken in conjunction with the accompanying drawings.

BRIEF DESCRIPTION OF THE DRAWINGS

FIG. 1 is a block diagram of a method for preparing a colorful sole in accordance with the present invention.

DETAILED DESCRIPTION OF PREFERRED EMBODIMENT

With reference to FIG. 1, a method for preparing a colorful sole for a shoe comprises the acts of obtaining a membrane with a porous surface, molding composition for the sole and a sole mold, printing patterns on the membrane, surface-treating the membrane, cutting the membrane into desired shapes, attaching the membrane pieces to the sole mold and pouring molding composition into the sole mold.

A membrane, molding composition for the sole and a sole mold are obtained. The membrane is adapted to combine with molding compositions and is selected from compositions in the group comprising polyethylene, polypropylene, polyvinyl chloride and thermoplastic urethane elastomer polymers. When the membrane is prepared, inorganic particles such as calcium carbonate, talc powder, clay, silicate, magnesium carbonate, zinc oxide, aluminum oxide are added to the polymers to improve the capability of the membrane to bond with the molding composition. When the membrane is produced, the inorganic particles separate from the surface of the membrane to form porous surfaces.

Desired patterns are printed on the porous surface of the membrane. Because the patterns are printed, desired patterns can be complicated or gradually changing colors to be more attractive to consumers.

After printing the desired patterns on the membrane, a protective layer is laminated with the membrane to protect the desired patterns and make the membrane waterproof.

The membrane with desired patterns is cut into pieces to correspond to shapes of different parts of the sole.

The membrane pieces are placed inside the sole mold at corresponding parts of the sole mold.

Molding composition for the sole is melted and then poured into the sole mold to combine with the membrane pieces. When the molding composition solidifies, a colorful sole with vivid and complicated patterns is achieved. Because the membrane pieces have porous surfaces and multiple tiny holes defined in the porous surface, the liquid molding composition permeates the membranes via the tiny holes to bond securely the membrane pieces to the sole when the liquid molding composition solidifies. Therefore, the colorful sole retains its appearance for a long period of time even after frequent washing.

Additionally, the method can be applied with other molding techniques to form a sole such as injection molding, compressing molding and blow molding.

The colorful sole is composed of a sole and at least one membrane piece with patterns. The at least one membrane piece has a porous surface into which molding composition for the sole permeates. The patterns are printed on the membrane piece. Therefore, complicated patterns or patterns having gradually changing colors can be bonded to the sole by laminating the membrane pieces on the sole to enhance the color and variety of the sole. Furthermore, the membrane piece does not easily fade or separate from the sole, and the colorful sole maintains a good appearance for a long time.

Even though numerous advantages of the present invention have been set forth in the foregoing description, the disclosure is illustrative only. Changes may be made in detail within the principles of the invention to the full extent indicated by the broad general meaning of the terms in which the appended claims are expressed.

What is claimed is:

1. A method for preparing a colorful sole comprising the acts of:

obtaining a membrane with a porous surface, molding composition for the sole and a sole mold, wherein the membrane is combined with the molding composition of the sole;

printing patterns on the membrane;

cutting the membrane with patterns into membrane pieces with desired shapes to correspond to shapes of different parts of the sole mold;

attaching the membrane pieces to the sole mold at corresponding parts of the sole mold;

pouring liquid sole molding composition into the sole mold to combine with the membrane pieces, wherein the molding composition enters the pores of the membrane pieces and solidifies to achieve a colorful sole.

2. The method for producing a colorful sole as claimed in claim 1, wherein the method further comprising the act of surface-treating the membrane after printing the desired patterns on the membrane, and then laminating a protective layer on the surface treated membrane to protect the patterns and make the membrane waterproof.

3. The method for producing a colorful sole as claimed in claim 1, wherein the membrane obtained is made of a compound selected from the group consisting of polyethylene, polypropylene, polyvinyl chloride and thermoplastic urethane elastomer polymers.

* * * * *